Oct. 30, 1956  W. H. STOUT  2,768,920
LIGHT WEIGHT PIPE AND METHOD OF MAKING SAME
Filed July 14, 1952  2 Sheets-Sheet 1

INVENTOR.
WILLIAM H. STOUT
BY
ATTORNEYS

Oct. 30, 1956　　　W. H. STOUT　　　2,768,920
LIGHT WEIGHT PIPE AND METHOD OF MAKING SAME
Filed July 14, 1952　　　2 Sheets-Sheet 2

INVENTOR.
WILLIAM H. STOUT
BY
Naylor and Lassagne
ATTORNEYS

United States Patent Office

2,768,920
Patented Oct. 30, 1956

2,768,920

LIGHT WEIGHT PIPE AND METHOD OF MAKING SAME

William H. Stout, Portland, Oreg.

Application July 14, 1952, Serial No. 298,691

1 Claim. (Cl. 154—83)

This invention relates to pipe having novel structure and to a method of making such pipe, and the essential object of the invention is to provide a light weight pipe of resin-impregnated laminated paper which has relatively high strength in comparison with hitherto known pipes of this general type.

In the pipe-making industry, there has been a long felt want for a satisfactory pipe structure which is cheap to manufacture, light in weight, of relatively high strength, and which is adapted for manufacture by a simple process. Such a pipe structure is particularly desirable for specialized uses, as for example, as components of irrigation equipment systems which are moved from place to place on irrigation land. Highly desirable characteristics of pipeline elements of such systems are lightest in weight, thus adapting the pipelines to be readily moved manually or by light mechanical systems, and having a strength sufficient to withstand the relatively high water pressures and the flexural forces imparted to the pipelines by the weight of the water within the lines and by the manual or mechanical handling or movement of the lines from place to place.

I am well aware of the fact that attempts have been made in the past to make pipe out of paper windings which have been impregnated with a suitable thermosetting resin, or the like, and that such attempts have included the utilization for the purpose of forming the pipe of an expansible mandrel operatively disposed within a suitable pipe mold. Pipe produced in this manner and constituted by the spirally arranged windings of a single strip of paper has not proved to be satisfactory for the principal reason that the tensile strength of the paper itself effectively resists to a marked degree the expansion of the mandrel, and it is thus not possible to sufficiently compact the wall of the pipe to obtain a pipe of satisfactory strength. The essential purpose of the present invention is to teach a method of forming a resin-impregnated laminated paper pipe having a more highly compacted wall structure, and thus a higher structural strength, than previous pipe structures of this general type.

In summary, I have found that a completely satisfactory pipe structure from the standpoints above enumerated can be obtained by the use of a plurality of radially overlapped and longitudinally extending strips of paper which have a width which is less than the circumferential dimension of the pipe. I have found that when such a preformed tubular pattern of resin-impregnated paper strips is placed over an expansible mandrel within a confining mold form that the mandrel is not prevented from expanding to exert its maximum compressive force due to the fact that the paper strips are relatively movable by the mandrel radially and circumferentially with respect to each other.

Figure 2:
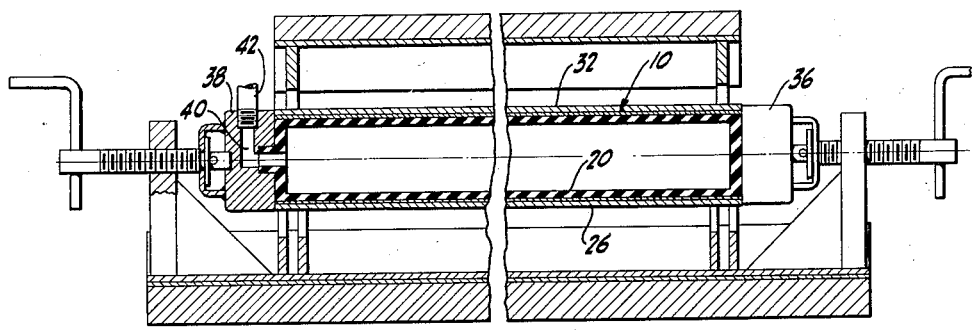
Figure 2 is a view in section of a form of apparatus that may be used to produce the pipe structure of Figure 1, the same being taken along lines 2—2 of Figure 3.

The pipe, indicated generally by reference numeral 10, is comprised of a plurality of radially and circumferentially staggered paper strips 12 having their edges 14 disposed parallel to each other and parallel to the longitudinal axis of the pipe. Preferably, the edges 14 of the paper strips are spaced an equal distance apart, or, in other words, the successive strips of paper overlap each other to an equal degree. The strips of paper are preferably equi-sized as to width, i. e., the dimension measured peripherally of the pipe. Also, it is desirable that the width of the strips be less than the circumference of the finished pipe, because the forming mandrel is more freely expansible to compact the wall of the pipe when this condition is maintained. In order to mask the edge line 14 at the inside and the outside of the pipe, single full circle wraps of paper 16 and 18 are used to form smooth inside and outside surfaces of the pipe.

The over-all process of manufacture of the pipe may be carried out in the following manner. Kraft paper, either of the highly calendered grade or wrapping paper grade, is cut into strips having the desired width and length dimensions. These strips are then dipped into a vat containing a suitable impregnating resin, such as one of the thermosetting phenolic type. The impregnated strips are then doctored and rolled into large rolls which are allowed to set without drying for about two days to insure thorough impregnation of the paper. Preferably they are then dried at room temperature or at a temperature below the molding temperature of the plastic employed, although this drying step may be omitted. When the pipe is to be formed, the strips are arranged in the flat in the overlapping pattern above described and rolled on the expansible mandrel of the molding apparatus which will be hereinafter briefly described.

Figure 4:
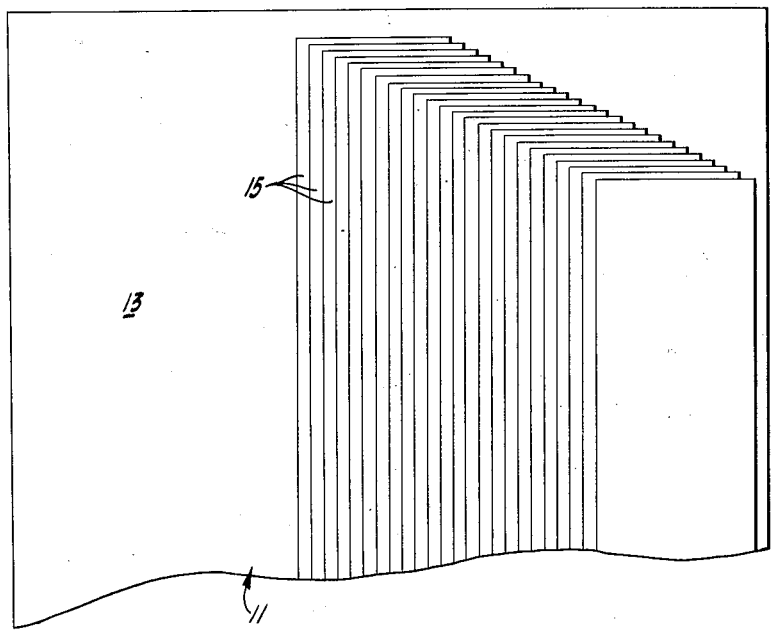
Figure 4 is a plan view of a wrap for forming pipe according to the present invention; the strips being offset from each other vertically of the sheet to show their relative positioning more clearly.
Figure 5:
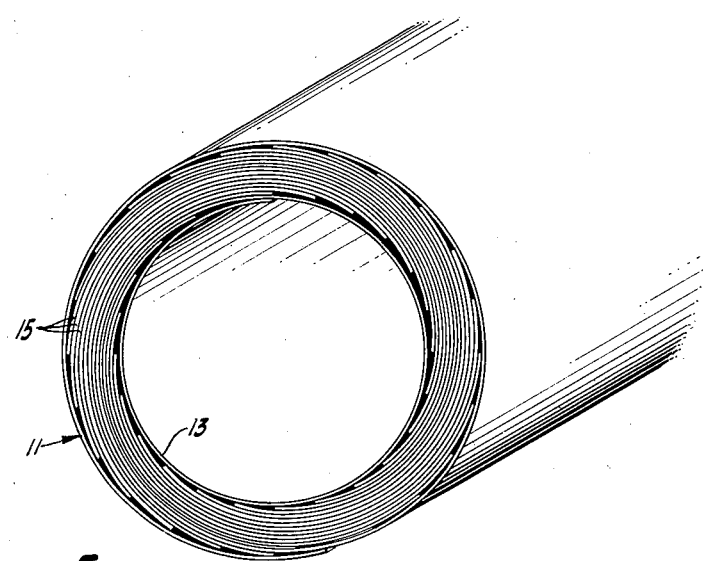
Figure 5 is a view in perspective of the end of a pipe formed from the wrap of Figure 4.

A preferred way of forming the strip pattern in the flat is to lay out a large sheet of kraft paper 11 (Figure 4) having a length corresponding to the length of the pipe unit to be made and having a width which is less than four and in excess of three times the circumference of the finished pipe. A free marginal space 13 is left at one side of this sheet; this marginal space being as wide as the inside circumferential dimension of the finished pipe, and the overlapping pattern of strips 15 is built up beside this marginal space on the sheet as shown in Figure 4; it being understood that it is unnecessary to offset the strips vertically of the sheet of drawing as shown. This illustration is merely for clarity. The sheet bearing the overlapping strip pattern is then rolled onto the expansible mandrel to the form shown in Figure 5, and in this winding step the free marginal end 13 of the sheet forms the inside layer of the pipe. The winding of the overlapped strip pattern on the mandrel results in the formation of a laminated cylinder having a uniform thickness, i. e., at any point through the wall of the pipe there is an equal number of plies of paper.

The following are given as examples of suitable thermosetting phenolic resins which have been used in the subject process: a fifty-fifty mixture of Durez resin 13373 and Monsanto resin Pf594 cut to a solid's content of approximately 55% with an alcohol and water solution; and U. S. Plywood resin Pf118A cut to a solid's content of 65% with water.

Figure 3:
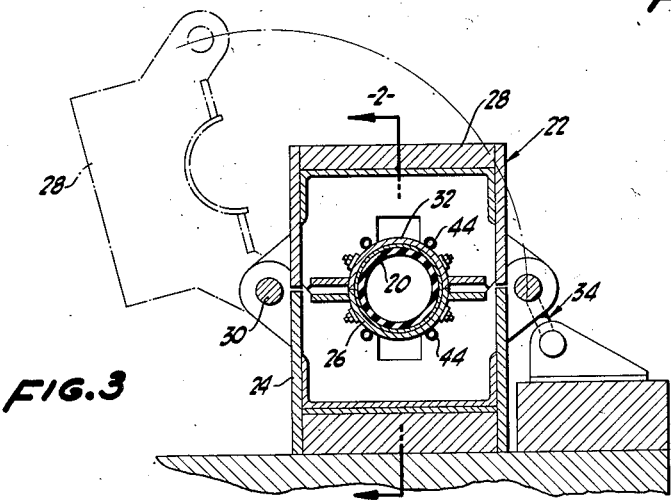
Figure 3 is a view in transverse cross-section of the apparatus of Figure 2.
Figure 1:
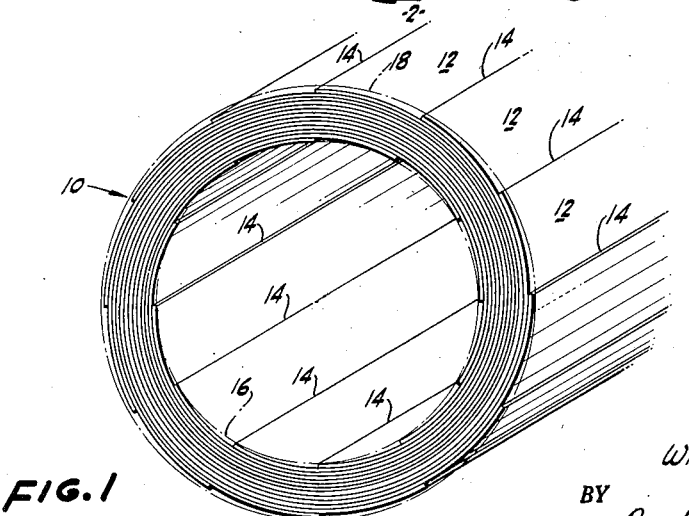
Figure 1 is a view in perspective of the end of a pipe formed according to the present invention.

After the preformed laminate has been sleeved over the expansible mandrel 20, it and the mandrel are placed in the molding apparatus indicated generally at 22 and shown in Figures 2 and 3. The molding apparatus 22 is comprised of a fixed base section 24 carrying a semi-cylindrical mold section 26, and a movable upper section 28 which is pivotally secured at 30 to the lower section and which carries a semi-cylindrical mold section 32. After the pipe form has been placed over the exansible mandrel 20 within the mold, the upper section 28 of the mold is closed and secured to the lower section by suitable latching means indicated generally at 34. End plugs 36 and 38, the latter having an air passage 40 providing for communication between the interior of the mandrel 20 and an air conduit 42 connected to a source of pressurized air, not shown, are then moved into engagement with the ends of the mold to serve as end reaction members for the mandrel.

The mandrel is then inflated to approximately 110 pounds pressure and the mold is heated to approximately 250° F. and maintained at this temperature for about 15-20 minutes. Steam lines, such as those indicated at 44, disposed adjacently to the mold sections 26 and 32 may be used to heat the molds. The pressure exerted by the mandrel during the setting of the resin is effective to decrease the pipe wall thickness approximately 50%. The resulting pipe structure is materially lighter in weight than aluminum pipe of similar size and wall thickness, and yet it is able to withstand internal pressures of 300-500 pounds per square inch.

What is claimed is:

A method of forming a multi-ply laminated pipe to have a highly compacted wall comprising the steps of impregnating strips of paper having a uniform width less than the desired circumferential dimension for said pipe, circumferentially overlapping the longitudinal edges of said strips to form a cylinder, subjecting said cylinder to an internal and outwardly directed pressure sufficient to cause relative circumferential movement between said strips while preventing unlapping between adjacent strips, and thermally setting said resin while said cylinder is being subjected to said pressure.

References Cited in the file of this patent

UNITED STATES PATENTS

| | | |
|---|---|---|
| 143,922 | Muller | Oct. 21, 1873 |
| 542,409 | Fletcher | July 9, 1895 |
| 607,594 | Sheriff | July 19, 1898 |
| 679,264 | Pedley | July 23, 1901 |
| 1,996,741 | Benge | Apr. 9, 1935 |
| 2,572,924 | Gonda | Oct. 30, 1951 |
| 2,574,920 | Ilch | Nov. 13, 1951 |
| 2,593,835 | Biggert et al. | Apr. 22, 1952 |
| 2,612,910 | Krupp | Oct. 7, 1952 |